United States Patent
Tsutsumitake et al.

(10) Patent No.: US 7,433,576 B2
(45) Date of Patent: Oct. 7, 2008

(54) VIDEO DATA RECORDING/REPRODUCING APPARATUS AND VIDEO DATA MANAGEMENT METHOD FOR USE IN THE SAME

(75) Inventors: Hideyuki Tsutsumitake, Yokohama (JP); Masaru Suzuki, Kawasaki (JP); Takero Kobayashi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 937 days.

(21) Appl. No.: 10/804,167

(22) Filed: Mar. 19, 2004

(65) Prior Publication Data

US 2004/0228607 A1  Nov. 18, 2004

(30) Foreign Application Priority Data

Apr. 28, 2003 (JP) .............................. 2003-123703

(51) Int. Cl.
*H04N 5/91* (2006.01)
*H04N 7/00* (2006.01)

(52) U.S. Cl. ..................... 386/46; 711/161; 711/162

(58) Field of Classification Search ............... 386/46; 711/161, 162
See application file for complete search history.

(56) References Cited

U.S. PATENT DOCUMENTS

| 5,652,613 A | 7/1997 | Lazarus et al. |
| 6,636,953 B2 * | 10/2003 | Yuasa et al. ................. 711/161 |
| 7,165,154 B2 * | 1/2007 | Coombs et al. .............. 711/162 |

FOREIGN PATENT DOCUMENTS

| CN | 1302155 A | 7/2001 |
| FR | 2803471 A1 | 7/2001 |
| JP | 2000-13745 | 1/2000 |
| JP | 2001-350631 | 12/2001 |
| JP | 2002-55856 | 2/2002 |
| JP | 2002-208983 | 7/2002 |
| JP | 2003-87768 | 3/2003 |

OTHER PUBLICATIONS

Notification of the First Office Action mailed on Jan. 6, 2006, from Chinese Patent Office in Chinese Patent Application No. 200410031154.4.
Communication from European Patent Office mailed Sep. 29, 2005, In European Patent Application No. 04005280.5-2202 PCT/.
Notification of Reasons for Rejection from Japanese Patent Office mailed Jun. 28, 2005, in Japanese Application No. 2003-123703.

* cited by examiner

*Primary Examiner*—Thai Tran
*Assistant Examiner*—Girumsew Wendmagegn
(74) *Attorney, Agent, or Firm*—Finnegan, Henderson, Farabow, Garrett, Dunner, L.L.P.

(57) ABSTRACT

A video data recording/reproducing apparatus includes an input device, a data storage unit that stores the video data item input by the input device, a communication unit that executes communicates with an external unit via a network, a unit that moves one of a plurality of video data items stored in the data storage unit to the external unit, a unit that reproduces to-be-reproduced video data item from the data storage unit if the to-be-reproduced video data item is stored in the data storage unit, and a unit that executes a streaming process to reproduce a stream of the to-be-reproduced video data item that is transferred from the external unit while the stream of the to-be-reproduced video data item is being received by the communication unit, if the to-be-reproduced video data item is stored in the external unit.

12 Claims, 8 Drawing Sheets

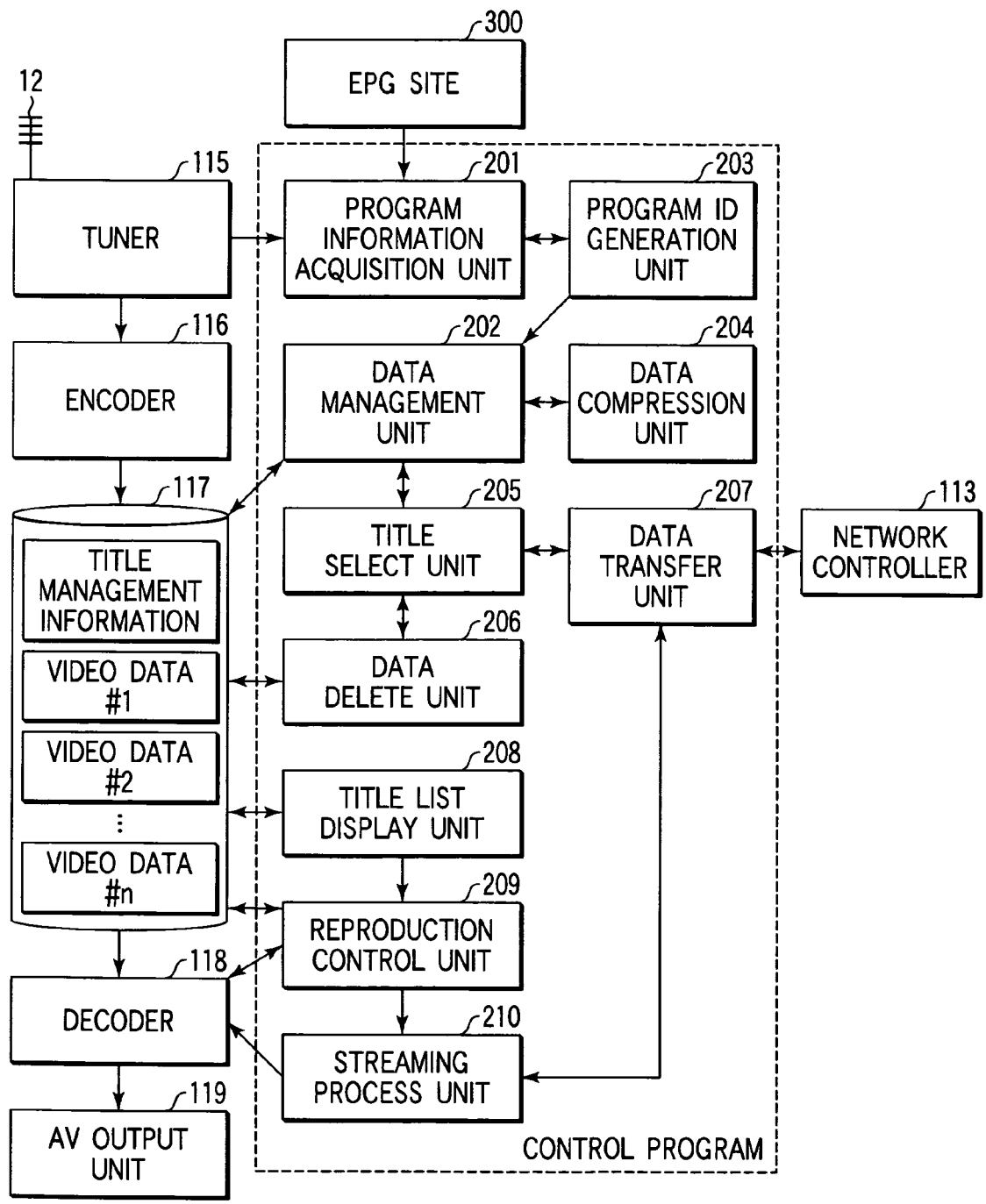
F I G. 2

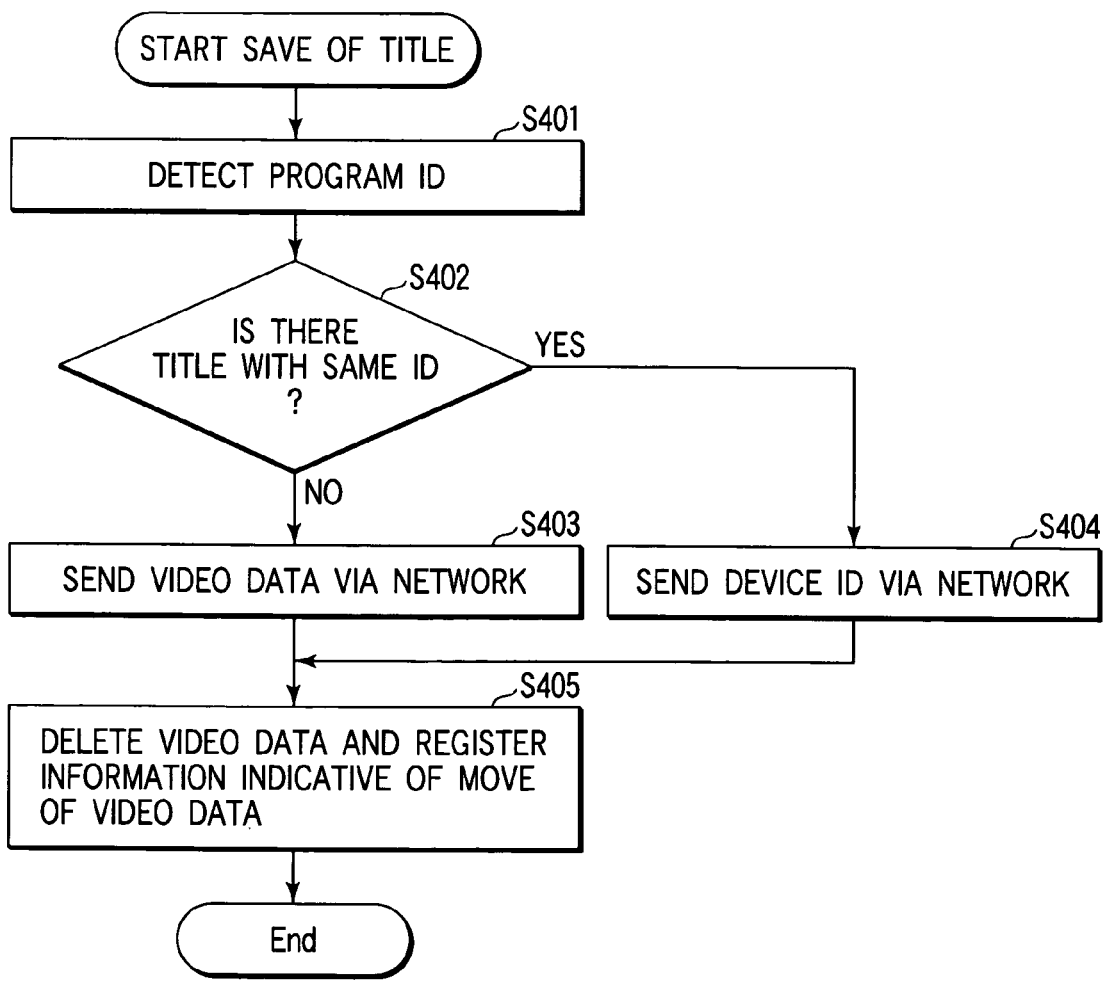
F I G. 7 ofthe # VIDEO DATA RECORDING/REPRODUCING APPARATUS AND VIDEO DATA MANAGEMENT METHOD FOR USE IN THE SAME

CROSS-REFERENCE TO RELATED APPLICATIONS

This application is based upon and claims the benefit of priority from prior Japanese Patent Application No. 2003-123703, filed Apr. 28, 2003, the entire contents of which are incorporated herein by reference.

BACKGROUND OF THE INVENTION

1. Field of the Invention

The present invention relates to a video data recording/reproducing apparatus, which records and reproduces video data, and a video data management method for used in the apparatus.

2. Description of the Related Art

In recent years, a variety of video data recording/reproducing apparatus have been developed, which are capable of recording and reproducing video data such as TV broadcast programs. In this type of video data recording/reproducing apparatuses, HDDs (hard disk drives) have begun to be used as video data recording media in place of conventional video tapes.

If a broadcast program is recorded on the HDD, high-speed finding of a start-point of the recorded broadcast program is enabled. In addition, by recording the broadcast program on the HDD, a so-called time-shift function (also known as time-slip function) is realized. The time-shift function is such a function that while a broadcast program is being recorded, the broadcast program that is being recorded can be reproduced from, e.g. its start point. Moreover, unlike video tapes, the HDD does not require an operation for finding a start-point of recording. In the state in which the HDD has a sufficient free space, recording can be started immediately.

Although the capacity of the HDD for use in video data recording/reproducing apparatuses has increased year by year, it is not limitless. Even in the video data recording/reproducing apparatus with a large-capacity HDD, an operation for deleting already recorded program data is required in order to keep a free space for new recording.

In a mobile information processing apparatus such as a PDA (Personal Digital Assistant), technology for effectively utilizing limited memory resources is adopted.

Jpn. Pat. Appln. KOKAI Publication No. 2001-350631 discloses a technique wherein in a case where a free space in a memory of a mobile information processing apparatus is so small that a new application program cannot be downloaded in the mobile information processing apparatus, an application program that is stored in the memory of the mobile information processing apparatus is temporarily saved in a server. In this apparatus of KOKAI 2001-350631, after execution of a downloaded new application program is finished, this application program is deleted from the memory and the application program that has been saved in the server is restored to the memory.

Jpn. Pat. Appln. KOKAI Publication No. 2000-13745 discloses an apparatus wherein video data recorded on the HDD is automatically compressed to keep a sufficient free space in the HDD. In this apparatus, in accordance with an elapsed time from recording of video data, the compression ratio for compressing the video data is altered.

In general terms, however, the quality of video data becomes lower in accordance with an increase in compression ratio of the video data.

If the technique of KOKAI 2001-350631, in which the program that has temporarily been saved in the server is restored to the memory, is applied to a video data recording/reproducing apparatus, the following situation would occur: each time video data that has temporarily been saved in the server is restored, other data that is stored in the HDD needs to be saved in the server. In this case, two data transfer operations need to be executed. That is, data transfer from the server to the video data recording/reproducing apparatus and data transfer from the video data recording/reproducing apparatus to the server are required. In usual cases, the data size of video data is much greater than that of program data. The two data transfer operations cause an increase in load that is needed for communication processing in the video data recording/reproducing apparatus.

BRIEF SUMMARY OF THE INVENTION

According to an embodiment of the present invention, there is provided a video data recording/reproducing apparatus comprising: an input device that inputs video data item to be recorded; a data storage unit that stores the video data item input by the input device; a communication unit that communicates with an external unit via a network; means for moving one of a plurality of video data items stored in the data storage unit to the external unit by communication between the communication unit and the external unit, to increase a free memory space in the data storage unit; means for determining whether to-be-reproduced video data item is stored in the data storage unit or in the external unit; means for reproducing the to-be-reproduced video data item from the data storage unit, if it is determined that the to-be-reproduced video data item is stored in the data storage unit; and means for executing a streaming process to reproduce a stream of the to-be-reproduced video data item that is transferred from the external unit while the stream of the to-be-reproduced video data item is being received by the communication unit, if it is determined that the to-be-reproduced video data item is stored in the external unit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing the functional configuration of a control program that is executed by a CPU provided in the video recorder shown in FIG. 1;

FIG. 7 is a flow chart showing an example of the procedure of a move process that is executed by the video recorder shown in FIG. 1;

DETAILED DESCRIPTION OF THE INVENTION

An embodiment of the present invention will now be described with reference to the accompanying drawings.

Figure 1:
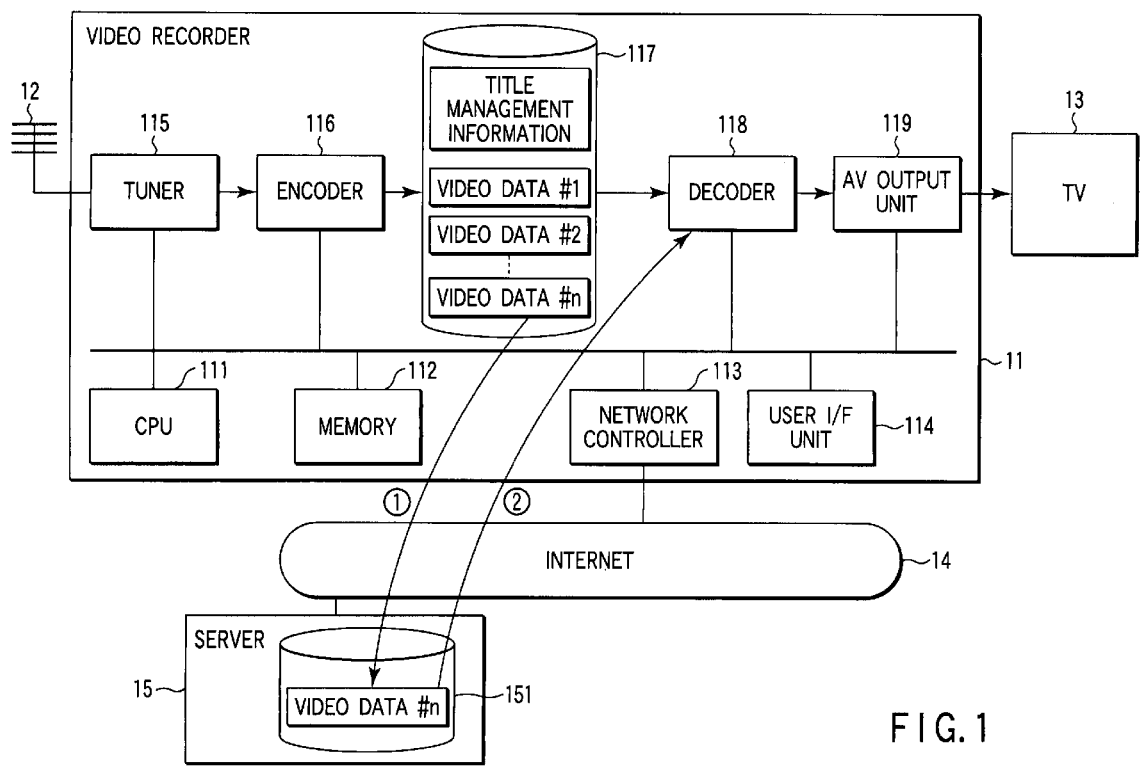
FIG. 1 is a block diagram showing the structure of a video recorder according to an embodiment of the present invention.

FIG. 1 shows the structure of a video recorder 11 according to an embodiment of the present invention. The video recorder 11 is a video data recording/reproducing apparatus that can digitally record and reproduce video data such as TV broadcast programs.

The video recorder 11 has a network function for connection to a local area network (LAN). The video recorder 11 can communicate with a server 15 via a network such as the Internet 14. The server 15 is an external unit in which video data that is recorded in the video recorder 11 is to be saved.

The video recorder 11, as shown in FIG. 1, comprises a CPU (Central Processing Unit) 111, a memory 112, a network controller 113, a user interface unit 114, a TV tuner 115, an encoder 116, a hard disk drive 117, a decoder 118, and an AV (audio-video) output unit 119.

The CPU 111 is a processor for controlling the operation of the video recorder 11. The CPU 111 executes, based on a control program stored in the memory 112, a video data record/reproduce process, a programmable recording process, a recorded title list display process, and a delete/move/copy process for recorded video data. The process for deleting or moving video data is automatically executed when deficiency in free space in the hard disk drive 117 is detected.

In the present embodiment, video data with specific attributes, which are deemed to have low importance for the user, is deleted from the hard disk drive 117. Other video data is moved from the hard disk drive 117 to the server 15 via the Internet 14. In the move process, to start with, video data is transferred from the hard disk drive 117 to the server 15 via the Internet 14. Then, the video data is deleted from the hard disk drive 117. Video data, which is actually present within the hard disk drive 117, is reproduced from the hard disk drive 117. On the other hand, reproduction of the video data, which has been moved to the server 15, is executed via the Internet 14 by using a streaming process. Making use of the streaming process, the video data that is moved to the server 15 can be reproduced via the Internet 14, without restoring the video data, as a file, to the hard disk drive 117 of the video recorder 11.

The video data copy function is used to create a backup copy in the server 15. Video data with specific attributes, which are deemed to have high importance for the user, is automatically copied from the hard disk drive 117 to the server 15.

The network controller 113 is a communication device for connecting the video recorder 11 to the LAN. The network controller 113 is connected to the Internet 14 via an ADSL (Asymmetric Digital Subscriber Line) modem, a fiber-optic communication modem, etc. The network controller 113 communicates with the server 15 via the Internet 14, thereby executing a process for transferring video data to the server 15 and a process for receiving a video data stream that is transferred from the server 15 by streaming.

The user interface unit 114 is a device for accepting instructions from the user, such as a recording instruction, a reproduction instruction and a programmable recording instruction. The user interface unit 114 comprises, for instance, key switches, and an infrared communication device for communication with a remote control unit.

The TV tuner 115 is a device that receives TV broadcast program data. The TV tuner 115 functions as an input device for inputting broadcast program data that is to be recorded. The TV tuner 115 is connected to an external TV antenna 12. The TV tuner 115 receives TV broadcast program data of a certain channel under control of the CPU 111.

The encoder 116 executes an encoding process for digital-compression-encoding the video data that is included in the broadcast program data received by the TV tuner 115. By the encoding process, video data that is composed of motion video is converted to a compression-encoded digital data stream, which conforms to, e.g. MPEG2 (MPEG: Moving Picture Coding Experts Group/Moving Picture Experts Group) format. The encoded video data is stored in the hard disk drive 117. The hard disk drive 117 is a data storage unit for storing encoded video data. The hard disk drive 117 stores, as well as encoded video data, title management information indicative of attributes of the video data.

The decoder 118 decodes the encoded video data under control of the CPU 111. The decoded video data is output to, e.g. a TV receiver 13 via the AV output unit 119.

A description will now be given of the operations for moving and reproducing video data (video data #n) that is stored in the hard disk drive 117.

(1) Move:

Video data #n that is stored in the hard disk drive 117 is transferred from the video recorder 11 to the server 15 by communication between the network controller 113 and server 15. The transferred video data #n is stored in a hard disk drive 151 of the server 15. Then, the video data #n is deleted from the hard disk drive 117 of video recorder 11.

(2) Reproduction:

The video data #n that has been moved to the hard disk drive 151 of server 15 is transferred from the server 15 to the video recorder 11 via the Internet 14 by communication between the network controller 113 and server 15. While receiving a stream of the video data #n from the server 15 via the network controller 113, the video recorder 11 decodes and reproduces the stream of the video data #n by means of the decoder 118 ("streaming"). The video data #n is not stored in the hard disk drive 117.

Referring now to FIG. 2, the functional configuration of the control program that is executed by the CPU 111 is described.

As is shown in FIG. 2, the control program comprises, as functional modules, a program information acquisition unit 201, a data management unit 202, a program ID generation unit 203, a data compression unit 204, a title select unit 205, a data delete unit 206, a data transfer unit 207, a title list display unit 208, a reproduction control unit 209 and a streaming process unit 210.

The program information acquisition unit 201 acquires program information (e.g. title, channel number, genre, etc.) in association with individual TV broadcast program data that is to be recorded on the video recorder 11. The program information can be acquired, for instance, by accessing an electronic program guide (EPG) site 300 on the Internet 14, or extracting program information that is superimposed on the TV broadcast program data received by the TV tuner 115. The program information is used as part of title management information for managing video data (broadcast program data) that is stored in the hard disk drive 117.

Figures 3, 4:
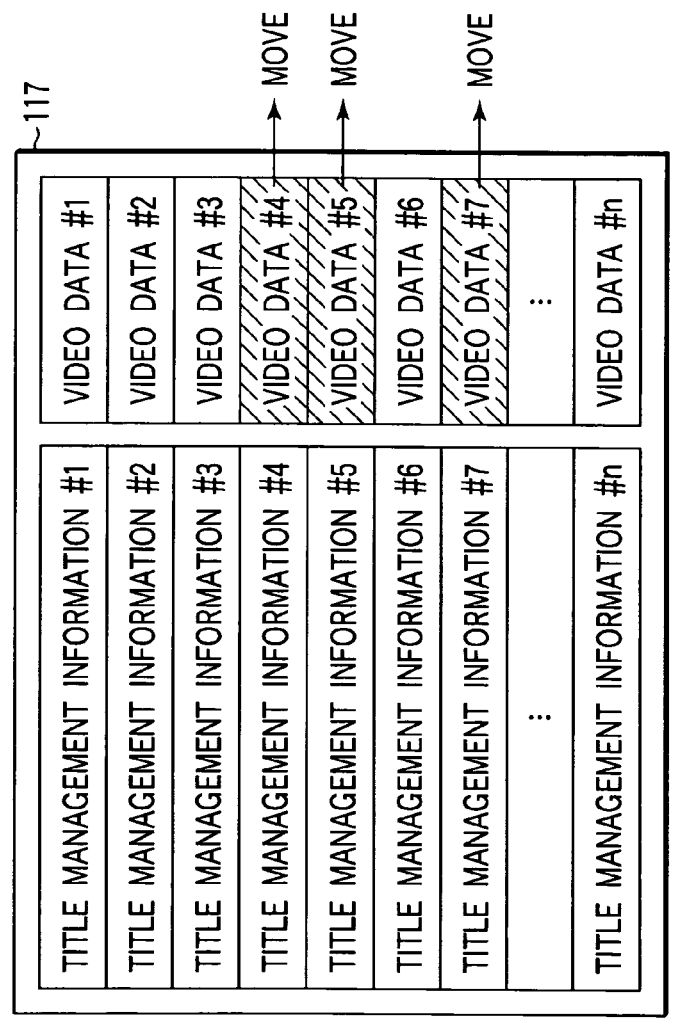
FIG. 3 shows an example of title management information that is used in the video recorder shown in FIG. 1.
FIG. 4 shows a relationship between title management information, which is used in the video recorder shown in FIG. 1, and video data.

The data management unit 202 manages, using the title management information, the individual video data (broadcast program data) that is stored in the hard disk drive 117. FIG. 3 shows an example of the title management information.

As shown in FIG. 3, the title management information includes the following attribute information in connection with each video data (broadcast program data): "program ID", "title of program", "channel number", "genre" (e.g. sports program, music program, news program, serial drama, a program that is to be rebroadcast, etc.), "date/time of recording", "length of program", "play history", and "other attributes". The "title of program", "channel number" and "genre" are the information that is acquired by the above-mentioned program information acquisition unit 201.

The "program ID" is an ID (identification information) for uniquely identifying recorded video data. The "program ID" is generated by the program ID generation unit 203. Specifically, the program ID generation unit 203 generates the program ID from the combination of, for instance, the title, channel number and genre, which are included in the program information. The "play history" is attribute information for managing the frequency of viewing/listening. For example, the "play history" indicates the number of times of play, and the date/time of last play. The "other attributes" contain attribute information relating to the degree of importance that is explicitly designated by the user (e.g. "unnecessary", "backup is necessary").

The title management information of each video data further includes information relating to the address (indicating the storage location on hard disk drive 117), the move (indicating whether the video data is video data that is moved to the server 15), and the backup (indicating whether the video data is video data that is backed up on the server 15).

The data compression unit 204 is used to enhance the compression ratio of compression-encoded video data that is stored on the hard disk drive 117. To be more specific, the data compression unit 204 subjects the video data, which is acquired by the data management unit 202 from the hard disk drive 117, to re-encoding, and thus reduces the size of the video data.

Based on the title management information managed by the data management unit 202, the title select unit 205 selects the video data that is to be deleted/moved/copied. The title select unit 205 searches the hard disk drive 117 for the video data with specific attributes that conform to predetermined delete/move/copy conditions. The data delete unit 206 deletes, from the hard disk drive 117, the video data that is selected by the title select unit 205 and conforms to the delete condition. In addition, after the video data, which is selected by the title select unit 205 and conforms to the move condition, has been saved in the server 15, the data delete unit 206 executes the process for deleting the video data from the hard disk drive 117.

The data transfer unit 207 executes transfer of video data with the server 15 via the network controller 113. The video data, which is selected by the title select unit 205 and conforms to the move/copy conditions, is transferred to the server 15 via the data transfer unit 207 and network controller 113. In this case, the data transfer unit 207 adds device ID information to the video data that is to be transferred to the server 15. The device ID information is an ID (device ID) for identifying the video recorder 11 and is used as verification information for confirming that the video data stored in the server 15 is the video data that has been moved from the video recorder 11.

The title list display unit 208 displays on the display screen of the TV 13 a list of recorded video data, which includes video data that is currently stored in the hard disk drive 117 and video data that is moved to the server 15, on the basis of the title management information stored in the hard disk drive 117. The user can select video data to be reproduced, from the list of the recorded video data.

Specifically, as shown in FIG. 4, only video data itself is moved to the server 15, and the title management information corresponding to the video data is retained within the hard disk drive 117. For example, even when video data #4, video data #5 and video data #7 are moved to the server 15, title management information #4, title management information #5 and title management information #7 associated with the video data #4, video data #5 and video data #7 are retained within the hard disk drive 117. Based on the title management information retained within the hard disk drive 117, it becomes possible to display a list of recorded video data that includes the video data that is currently stored in the hard disk drive 117 and the video data that is moved to the server 15.

The reproduction control unit 209 reproduces video data, which the user has selected as to-be-reproduced video data from the list of recorded video data. In this case, the reproduction control unit 209 determines whether the selected to-be-reproduced video data is present in the hard disk drive 117 or in the server 15. If the to-be-reproduced video data is present in the hard disk drive 117, the reproduction control unit 209 reads out the video data from the hard disk drive 117 and transfers it to the decoder 118. Thus, the video data is reproduced from the hard disk drive 117.

On the other hand, if the to-be-reproduced video data is present in the server 15, the reproduction control unit 209 activates the streaming process unit 210, thereby to reproduce the to-be-reproduced video data from the server 15. The streaming process unit 210 executes a streaming process to receive a stream of the video data from the server 15 and reproduce the received stream of the video data while the stream of the video data is being received. In the streaming process, the streaming process unit 210 first issues, via the data transfer unit 207 and network controller 113, a request to the server 15 for stream transfer of the to-be-reproduced video data. The streaming process unit 210 then reproduces the to-be-reproduced video data using the decoder 118, while receiving the stream of the to-be-reproduced video data, which is transferred from the server 15 over the Internet 14 via the network controller 113 and data transfer unit 207 ("streaming process").

Figure 5:
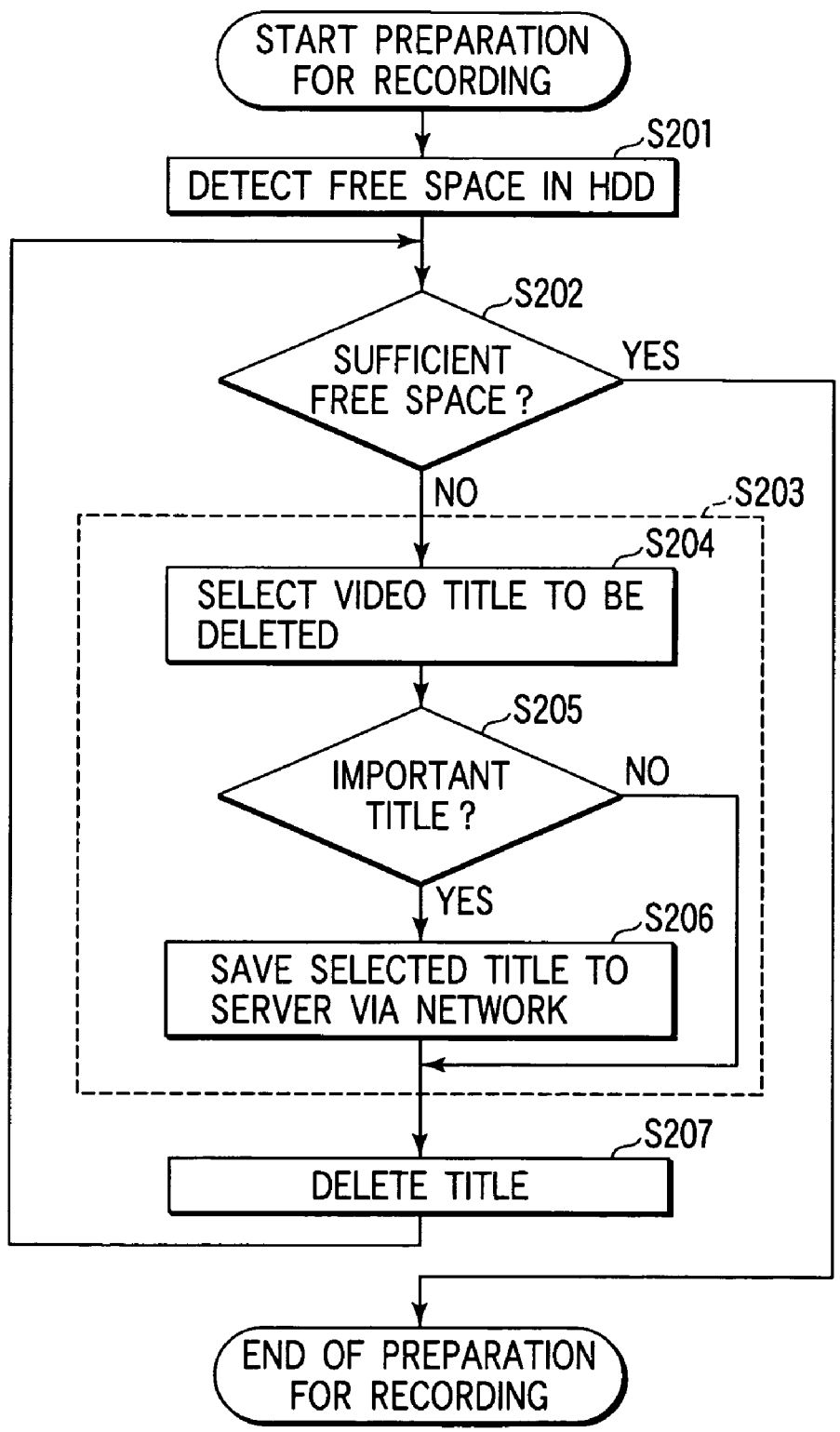
FIG. 5 is a flow chart showing an example of the procedure of a preparation-for-recording process, which is executed by the video recorder shown in FIG. 1.

Next, referring to a flow chart of FIG. 5, a description is given of a preparation-for-recording process, which is executed by the CPU 111 in order to secure a free memory space in the hard disk drive 117.

This preparation-for-recording process is periodically executed at regular time intervals. To start with, the CPU 111 detects the size of a free memory space in the hard disk drive (HDD) 117 (step S201), thereby determining whether there is a sufficient disk space or not, that is, whether the detected size of free memory space is at least a predetermined reference value (step S202). The reference value in this case is a default fixed value or a value indicative of the size of a free memory space that is needed to record all video data, for which programmed recording is currently set.

If there is a sufficient free memory space (YES in step S202), the preparation-for-recording process is finished. If there is no sufficient free memory space, that is, if the detected size of free memory space is less than the predetermined reference value, the CPU 111 executes a process for selecting video data to be deleted/moved, by using the title select unit 205 (step S203).

In step S203, the CPU 111 selects, as to-be-deleted video data, video data of, e.g. predetermined genre, on the basis of the title management information (step S204). Then, referring to the "play history" of the selected video data, the CPU 111 checks the frequency of viewing/listening of the video data and determines whether the selected video data is important for the user (step S205). For example, video data, which has never been reproduced, or video data with high frequency of viewing/listening, which has been reproduced more than a predetermined number of times, is determined to be important for the user.

If the selected video data is determined to be important for the user (YES in step S205), the CPU 111 determines that this video data is the video data that has attributes meeting the condition for move. Using the data transfer unit 207 and network controller 113, the CPU 111 saves the video data in the server 15 via the Internet 14 (step S206). In step S206, the CPU 111 adds the program ID and device ID of video recorder 11 to the video data, and then transmits the video data to the server 15 by communication between the network controller 113 and server 15.

The video data, which has been transmitted to the server 15, is stored in the hard disk drive 151 of the server 15. Then, using the data delete unit 206, the CPU 111 deletes from the hard disk drive 117 the video data that has been saved in the server 15 (step S207). It is only the video data itself that is deleted, and the title management information associated with the video data is not deleted and is retained in the hard disk drive 117.

On the other hand, if the selected video data is determined to be unimportant for the user (NO in step S205), the CPU 111 determines that this video data is the video data that has attributes meeting the condition for delete. Using the data delete unit 206, the CPU 111 deletes the video data from the hard disk drive 117 (step S207). In this case, too, it is only the video data itself that is deleted, and the title management information associated with the video data is not deleted and is retained in the hard disk drive 117.

The process of steps S204 to S207 is repeatedly executed until a sufficient free memory space is secured.

Figure 6:
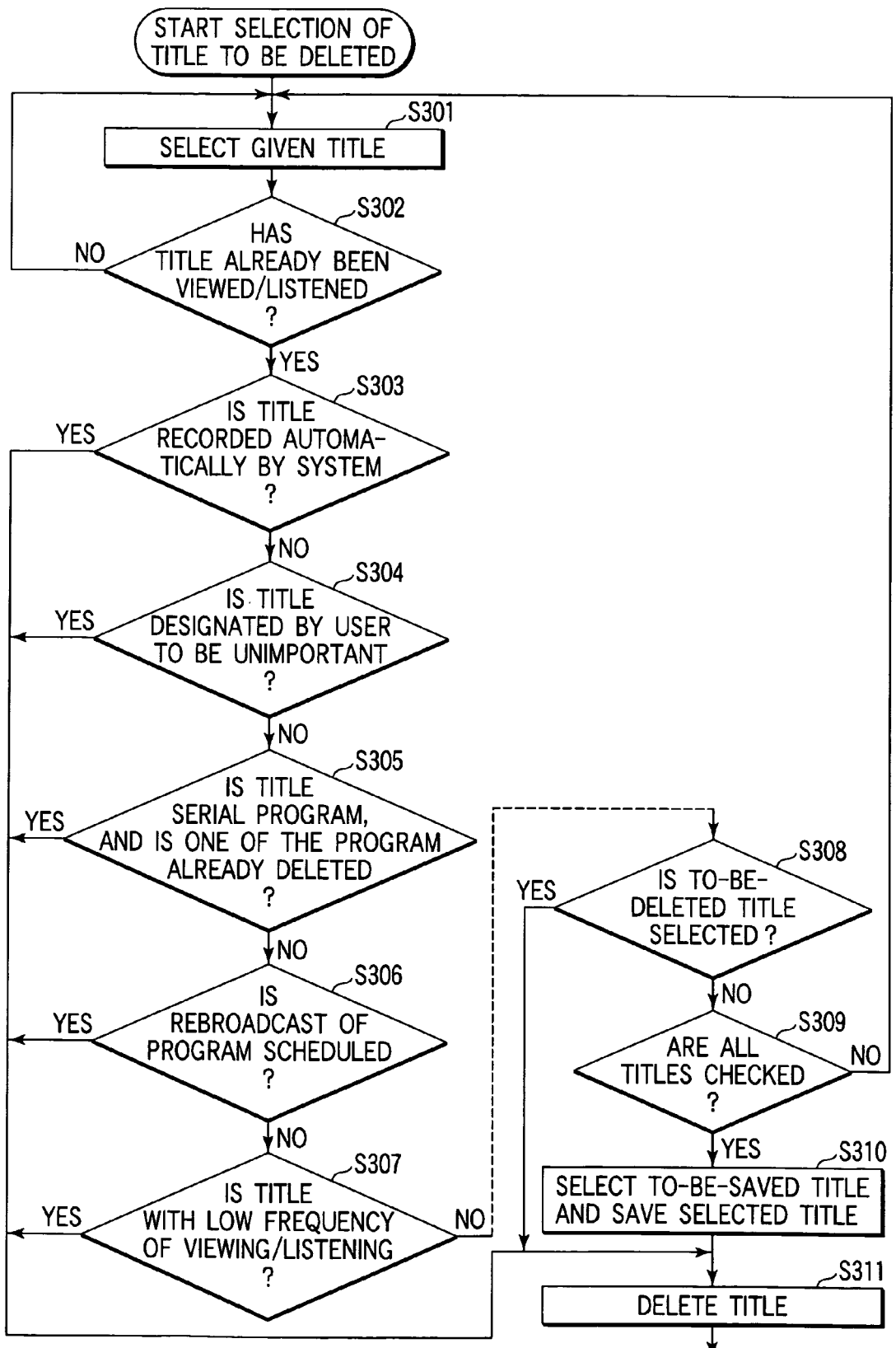
FIG. 6 is a flow chart showing an example of the procedure of a title-to-be-deleted/moved select process, which is executed by the video recorder shown in FIG. 1.

Next, referring to a flow chart of FIG. 6, a description is given of a specific example of the process for determining whether video data is important for the user.

To start with, a process is executed for searching the video data group stored in the hard disk drive 117 for deletable video data (video data not important for the user). If deletable video data is not found, any video data within the hard disk drive 117 is selected as video data that meets the condition for move.

Specifically, the CPU 111 first selects given video data stored in the hard disk drive 117 (step S301), and then determines, based on the "play history" of the title management information associated with this video data, whether the video data has already been viewed/listened (i.e. already reproduced video data) (step S302). The already viewed/listened video data is selected as deletable video data (title) if it meets the conditions described below.

(1) Video Data that has Automatically been Recorded by the System:

The video recorder 11 has a function of automatically recording video data, other than video data for programmed recording, if such video data belongs to a specific genre that is pre-designated by the user ("automatic recording function"). The CPU 111 determines whether the video data selected in step S301 is video data that has been automatically recorded (step S303). If it is determined to be the automatically recorded video data (YES in step S303), this video data is deleted from the hard disk drive 117 (step S311).

(2) Video Data that the User Designates as Unnecessary:

Referring to the "other attributes" of the title management information, the CPU 111 determines whether the video data selected in step S301 is video data that the user has explicitly pre-designated as unnecessary (or video data belonging to a specific genre that the user has pre-designated as unnecessary) (step S304). If it is determined to be the video data that the user has explicitly pre-designated as unnecessary (or video data belonging to a specific genre that the user has pre-designated as unnecessary) (YES in step S304), the video data selected in step S301 is deleted from the hard disk drive 117 (step S311).

(3) Video Data which has Attributes of a Serial Program and from which One of the Other Video Data Relating to the Serial Program has Already been Deleted by the User:

In a case where the video data selected in step S301 is video data that has attributes of a serial program such as a serial drama, the CPU 111 determines whether some other video data corresponding to the serial drama has already been deleted from the hard disk drive 117 by the user (step S305). If other video data corresponding to the serial drama has already been deleted (YES in step S305), the video data selected in step S301 is deleted from the hard disk drive 117 (step S311). The determination for condition (3) is realized, for example, by recording the genre of video data that was deleted by the user's operation.

(4) Program for which Rebroadcast is Scheduled:

Referring to the "genre" in the title management information, the CPU 111 determines whether the video data selected in step S301 is video data of a program for which rebroadcast is scheduled (step S306). If it is determined to be the video data of a program for which rebroadcast is scheduled (YES in step S306), the video data is deleted from the hard disk drive 117 (step S311).

(5) Video Data with Low Frequency of Viewing/Listening:

Referring to the "play history" in the title management information, the CPU 111 determines whether the video data selected in step S301 is video data with low frequency of viewing/listening (step S307). If it is determined to be the video data with low frequency of viewing/listening (YES in step S307), the video data is deleted from the hard disk drive 117 (step S311).

According to the above-described conditions, the determination of deletable video data is effected. Until finding deletable video data, the video data for search is altered and the process of steps S302 to S307 is repeatedly executed (step S308, step S309).

If it is determined that none of the video data stored in the hard disk drive 117 is deletable (YES in step S309), the CPU 111 executes the video data move process (step S310). In step S310, the CPU 111 adds the program ID and device ID of video recorder 11 to given video data within the hard disk drive 117 (i.e. video data that does not meet the delete condition), and then saves the video data in the server 15. Then, the CPU 111 deletes from the hard disk drive 117 the video data that has been saved in the server 15 (step S311).

The above-described conditions (1) to (5) are mere examples, and other conditions can be used. Besides, a free memory space may be secured by the move process alone, without performing the process of deleting video data from the hard disk drive 117. In this case, after the video data that conforms to any one of the conditions (1) to (5) is saved in the server 15, the video data may be deleted from the hard disk drive 117.

Next, referring to a flow chart of FIG. 7, a description is given of the move process for moving the video data to the server 15. In this case, the procedure of the move process, which can prevent overlapped storage of the same video data in the hard disk drive 151 in the server 15, is described.

When to-be-moved video data is selected, the CPU 111 refers to the title management information corresponding to the to-be-moved video data and detects the program ID of the video data (step S401). Then, the CPU 111 executes communication with the server 15 over the Internet 14 and checks the contents of the hard disk drive 151, thereby determining whether the video data having the same program ID as the to-be-moved video data is already present in the hard disk drive 151 (step S402).

In an environment where a plurality of video recorders 11 of different users are connected to the server 15 via the Internet 14, video data is moved to the server 15 from the video recorders 11 of the different users. Consequently, the same video data as the to-be-moved video data, that is, the video data with the same program ID as the to-be-moved video data, may possibly be present in the hard disk drive 151 of server 15.

If the hard disk drive 151 of server 15 includes no video data that has the same program ID as the to-be-moved video data (NO in step S402), the CPU 111 communicates with the server 15 over the Internet 14 and transmits to the server 15 the to-be-moved video data, to which the program ID and device ID are added (step S403). On the other hand, if the hard disk drive 151 of server 15 includes video data that has the same program ID as the to-be-moved video data (YES in step S402), the CPU 111 communicates with the server 15 over the Internet 14 and transmits only the program ID and device ID to the server 15 (step S404). The server 15 manages the received device ID in association with the video data that is designated by the received program ID.

Whichever step, step S403 or step S404, is executed, the CPU 111 deletes the to-be-moved video from the hard disk drive 117, and sores information indicative of the move of the video data in the associated title management information (step S405).

As has been described above, using the program ID of the to-be-moved video data, it is determined whether the same video data as the to-be-moved video data is already present in the hard disk drive 151 of server 15. Thereby, overlapped storage of the same video data in the server 15 by the move of the video data can be prevented.

Even in the case where video data having the same program ID as the to-be-moved video data is already present in the hard disk drive 151 of server 15, if the image quality of the to-be-moved video data is higher than that of the video data that is already present in the hard disk drive 151 of server 15, the to-be-moved video data may be moved to the server 15.

Assume, for example, that a video recorder 11 possessed by a user #A and a video recorder 11 possessed by a user #B are connected to the server 15 over the Internet 14 and video data items with the same program ID are moved to the server 15 by these video recorders 11. In usual cases, since these video data items have the same program ID, only one of them is saved in the server 15 in order to avoid overlapping of video data. However, in the case where low-quality video data of a certain program is first moved from the user #A's video recorder 11 and then high-quality video data of the same program is to be moved from the user #B's video recorder 11, the high-quality video data that is recorded in the user #B's video recorder 11 may also be moved to the server 15. Thereby, the user #B can reproduce, by the streaming process, the high-quality video data that is moved to the server 15.

Needless to say, two video data items of the same program with different image qualities may not individually be stored in the server 15. The low-quality video data that is already present in the server 15 may be replaced with the high-quality video data that is newly transmitted to the server 15.

Figure 8:
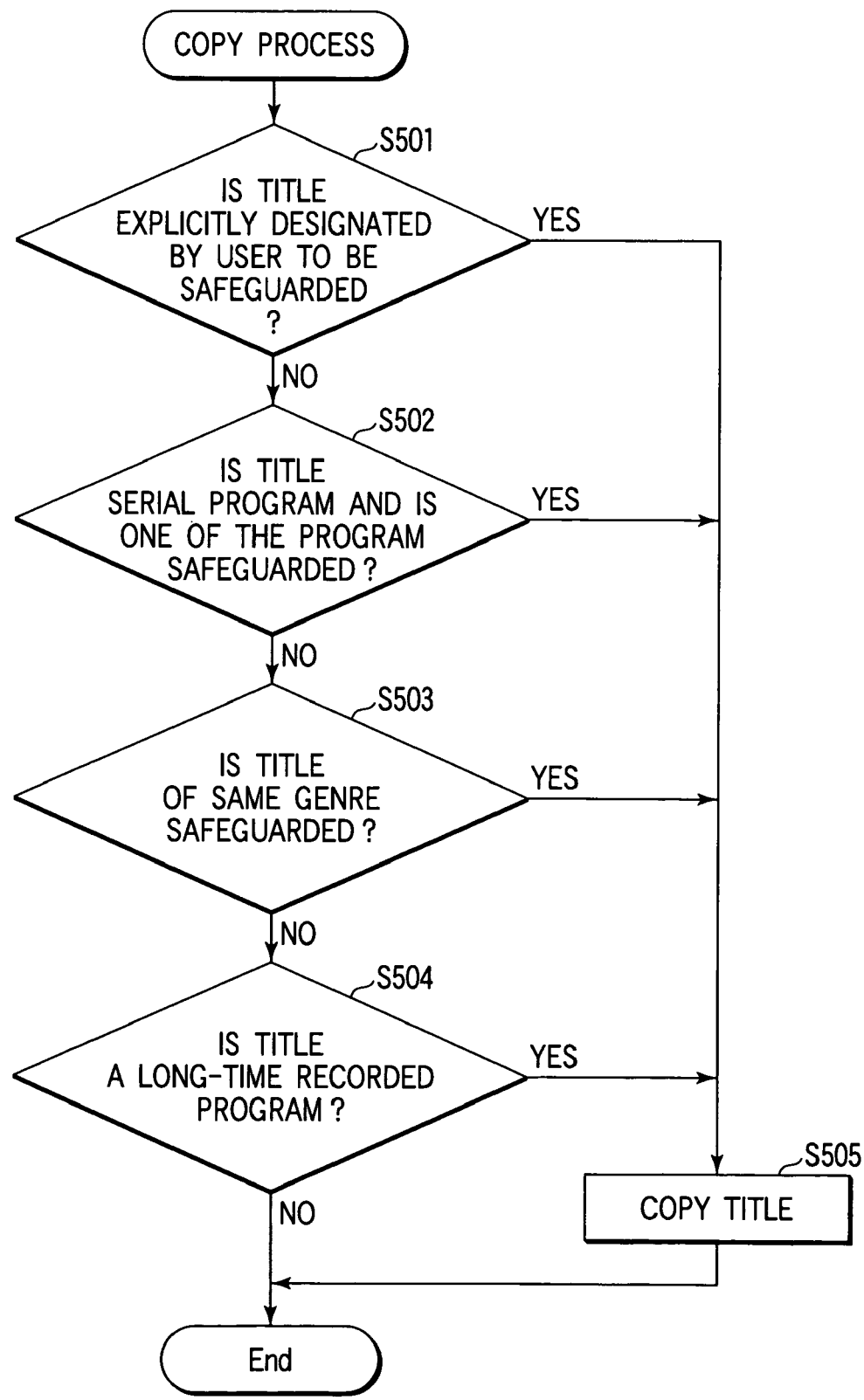
FIG. 8 is a flow chart showing an example of the procedure of a copy process that is executed by the video recorder shown in FIG. 1.

Next, referring to a flow chart of FIG. 8, a video data copy process is described. The copy process is executed in order to back up the video data in the server 15.

If a fault occurs in the hard disk drive 117, the video data stored in the hard disk drive 117 cannot be reproduced. To prevent this, the copy process is periodically executed by the CPU 111, as described below.

Video data, which is an object of the copy process, is the video data that is deemed to be very important for the user. Video data that meets the following conditions is automatically copied to the server 15.

(1) Video Data for which the User Explicitly Designates Backup ("Safeguard"):

Referring to the "other attributes" in the title management information, the CPU 111 acquires from the hard disk drive 117 the video data for which the user explicitly designates the necessity for backup, and copies the acquired video data into the server 15 (step S501, S505).

(2) Video Data that has Attributes of a Serial Program, in Connection with which One of the Other Video Data Items Relating to the Serial Program has Already been Safeguarded by the User:

In a case where a plurality of video data corresponding to a serial program such as a serial drama are present in the hard disk drive 117 and video data corresponding to the serial drama is already backed up by the user, the CPU 111 acquires the other video data items corresponding to the serial drama from the hard disk drive 117 and copies them into the server 15 (step S502, S505). The determination for condition (2) is realized, for example, by recording the genre of video data that was copied by the user's operation.

(3) Video Data that Belongs to the Same Genre as the Video Data that is Already Backed up by the User:

If video data belonging to a certain genre (e.g. sports program) is already safeguarded by the user's operation, the CPU 111 acquires the other video data items belonging to the same genre from the hard disk drive 117 and copies them into the server 15 (step S503, S505). The determination for condition (3) is realized, for example, by recording the genre of video data that was copied by the user's operation.

(4) Video Data with a Long Recording Time:

Referring to "length" in the title management information, the CPU 111 acquires from the hard disk drive 117 the video data whose recording time is longer than a predetermined time, and copies it into the server 15 (step S504, S505).

As has been described above, the copy process is executed for backing up the video data. Even in the case of video data that is copied into the server 15, it is reproduced from the hard disk drive 117 unless a fault occurs in the hard disk drive 117.

Figure 9:
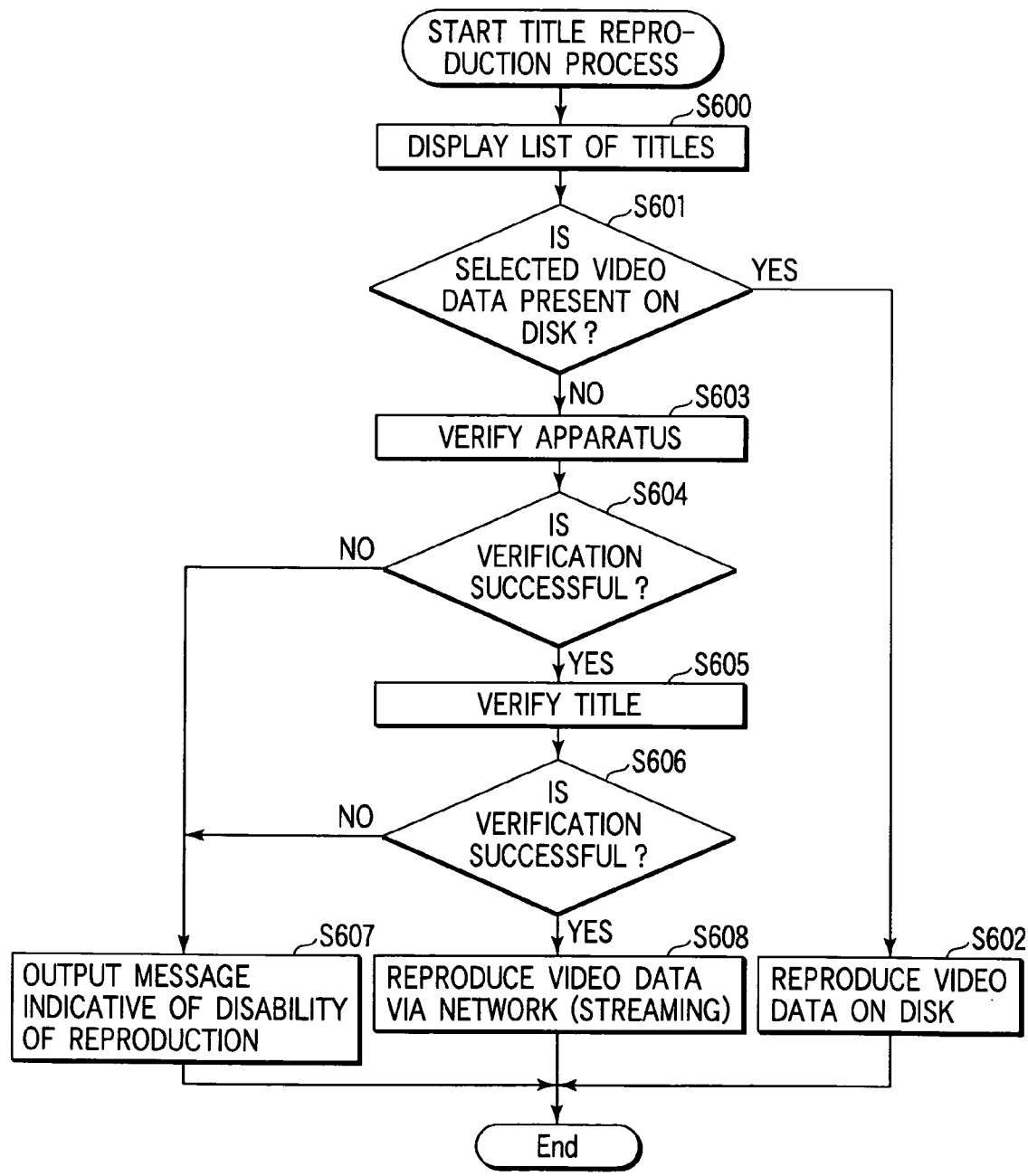
FIG. 9 is a flow chart illustrating the procedure of a reproduction process that is executed by the video recorder shown in FIG. 1.

Next, a process for reproducing recorded video data is described with reference to a flow chart of FIG. 9.

Based on the title management information stored in the hard disk drive 117, the CPU 111 displays on the screen of TV 13 a title select dialogue that shows a list of recorded titles (step S600). The title select dialogue is a screen for prompting the user to select video data to be reproduced. The title select dialogue displays attribute information, such as the title, channel number, genre and record date/time, of recorded video data including video data that is currently stored in the hard disk drive 117 and video data that is moved to the server 15. The user is able to select, as to-be-reproduced video data, desired video data that is displayed on the title select dialogue.

If to-be-reproduced video data is selected by the user, the CPU 111 determines whether the selected video data is present in the hard disk drive 117 (step S601). In step S601, for example, the CPU 111 refers to the "move" information in the title management information that is associated with the selected video data, and determines whether the selected to-be-reproduced video data is the video data that is moved to the server 15 or the video data that is present in the hard disk drive 117. If the selected to-be-reproduced video data is present in the hard disk drive 117 (YES in step S601), the CPU reproduces the to-be-reproduced video data from the hard disk drive 117, using the reproduction control unit 209 and decoder 118 (step S602). In step S602, the CPU 111 reads out the to-be-reproduced video data from the hard disk drive 117 and decodes it using the decoder 118. The decoded video data is displayed on the TV 13.

On the other hand, if the selected to-be-reproduced video data is the video data that is moved to the server 15 (NO in step S601), the CPU 111 executes a device verification process for determining whether the to-be-reproduced video data stored in the server 15 is the video data that is recorded by the video recorder 11 (step S603). In the device verification, the device ID that is added to the to-be-reproduced video data stored in the server 15 is compared with the device ID of the video recorder 11. On condition that these device IDs coincide, the to-be-reproduced video data stored in the server 15 is determined to be the video data that is recorded by the video recorder 11.

If the device verification fails, that is, if it is not confirmed that the to-be-reproduced video data stored in the server 15 is the video data recorded by the video recorder 11 (NO in step S604), the CPU 111 displays on the TV 13 a message indicating the disability of reproduction (step S607).

If the device verification is successfully carried out, that is, if it is confirmed that the to-be-reproduced video data stored in the server 15 is the video data recorded by the video recorder 11 (YES in step S604), the CPU 111 performs a title verification process, where necessary (step S605). The title verification process is executed, for example, in a case where the video data is encrypted using the program ID, for instance, as a key, and then the encrypted video data is moved to the server 15. In this case, a process of, e.g. key exchange for releasing encryption, is executed between the CPU 111 and server 15. If key exchange is not normally executed (NO in step S606), the CPU 111 displays on the TV 13 a message indicating the disability of reproduction (step S607).

On the other hand, if the device verification and necessary title verification are successfully done, the CPU 111 executes a streaming process (step S608). In the streaming process, the CPU 111 reproduces the to-be-reproduced video data while receiving it from the server 15 via the Internet 14, using the streaming process unit 210, data transfer unit 207, network controller 113 and decoder 118. In step S608, the CPU 111 requests the server 15 to transfer the stream of the to-be-reproduced video data from the server 15 to the video recorder 11 via the Internet 14. While receiving the stream of to-be-reproduced video data from the server 15 via the network controller 113, the CPU 111 delivers it to the decoder 118. The video data that is decoded by decoder 118 is displayed on the TV 13. Real-time transport protocol (RTP), for instance, is used for streaming-transfer of video data from the server 15. Needless to say, the CPU 111 may receive a stream of to-be-reproduced video data from the server 15 by repeatedly sending to the server 15 a read request for reading the stream of to-be-reproduced video data from the server 15 in units of a predetermined data length.

As has been described above, according to the present embodiment, for example, when a free space in the hard disk drive 117 becomes deficient, video data is automatically moved from the hard disk drive 117 to the server 15. Thereby, a free space necessary for recording new video data can be provided and secured. When video data that is moved to the server 15 is to be reproduced, the streaming process is executed to reproduce the video data while receiving a stream of the to-be-reproduced video data that is transferred from the server 15. In this case, there is no need to restore the to-be-reproduced video data to the hard disk drive 117. Thus, the video data that is moved to the server 15 can be reproduced without the need to perform such a process as to temporarily move other video data from the hard disk drive 117 to the server 15. Compared to the case where the video data that is moved to the server 15 is restored to the hard disk drive 117, the load required for the communication process between the server 15 and video recorder 11 can greatly be reduced.

As regards the video data that is backed up in the server 15, it can be reproduced by the same procedure as the procedure of reproducing the video data that is moved to the server 15. Of course, the video data that is backed up by the server 15 may be downloaded as a file into the hard disk drive 117.

The algorithm for selecting video data that is to be moved to the server is not limited to the examples illustrated in FIGS. 5 and 6. For example, an algorithm for preferentially moving video data with a small data amount may be applied. Various examples may be available as to at what time point the record data is to be moved via the network. For example, the record data may be moved in a time zone that is explicitly designated by the user, a midnight time zone when the video recorder 11 is not in use, or a time zone when programmed recording is not set. Besides, in the environment where the video recorder 11 is used by a plurality of users, the verification process at the time of reproducing the moved video data may be performed on a user-by-user basis, making use of, e.g. the user name or password that is input by the user.

The video data may be moved not only to intelligent equipment such as the server 15, but also to a variety of external devices having data storage units, which can be network-connected. The network for transferring video data may be either a wired network or a wireless network. The video data may be moved/copied to not only external devices on a global network such as the Internet, but also to external devices on local area networks which are realized by, e.g. USB (Universal Serial Bus), IEEE1394, or Bluetooth™.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video data recording/reproducing apparatus comprising:

an input device that inputs video data item to be recorded;
a data storage unit that stores the video data item input by the input device;
a communication unit that communicates with an external unit via a network;
means for moving one of a plurality of video data items stored in the data storage unit to the external unit by communication between the communication unit and the external unit, to increase a free memory space in the data storage unit, the moving means including means for adding identification information for identifying the video data recording/reproducing apparatus to a video data item that is to be moved to the external unit;

means for determining whether a to-be-reproduced video data item is stored in the data storage unit or in the external unit;

means for reproducing the to-be-reproduced video data item from the data storage unit, if it is determined that the to-be-reproduced video data item is stored in the data storage unit;

means for executing a verification process for determining whether a to-be-reproduced video data item stored in the external unit is the video data item that is moved from the video data recording/reproducing apparatus, based on identification information that is added to the to-be-reproduced video data item stored in the external unit;

means for executing a streaming process to reproduce a stream of the to-be-reproduced video data item that is transferred from the external unit while the stream of the to-be-reproduced video data item is being received by the communication unit, if it is determined that the to-be-reproduced video data item is stored in the external unit and is the video data item that is moved from the video data recording/reproducing apparatus; and means for prohibiting execution of the streaming process if it is determined that the to-be-reproduced video data item is not the video data item that is moved from the video data recording/reproducing apparatus.

2. The video data recording/reproducing apparatus according to claim 1, further comprising means for displaying a list of recorded video data items including video data item that is currently stored in the data storage unit and video data item that is moved to the external unit, wherein the determining means includes means for determining whether to-be-reproduced video data item, which is selected from the list of recorded video data items, is stored in the data storage unit or in the external unit.

3. The video data recording/reproducing apparatus according to claim 1, wherein the moving means includes means for detecting a size of a free memory space in the data storage unit, and means for moving, if the detected size of the free memory space decreases to less than a predetermined value, one of a plurality of video data items stored in the data storage unit to the external unit by communication between the communication unit and the external unit.

4. The video data recording/reproducing apparatus according to claim 1, further comprising:

means for detecting a size of a free memory space in the data storage unit;

means for finding video data item with attributes corresponding to a specified condition for deletion, on the basis of attributes of the plurality of video data items stored in the data storage unit, if the detected size of the free memory space decreases to less than a given value; and means for deleting the found video data item from the data storage unit, wherein the moving means includes means for moving one of the plurality of video data items stored in the data storage unit to the external unit by communication between the communication unit and the external unit if the video data item with attributes corresponding to the specified condition for deletion is not found.

5. The video data recording/reproducing apparatus according to claim 1, further comprising means for copying video data item with attributes, which correspond to a specified condition for backup, to the external unit by communication between the communication unit and the external unit, on the basis of attributes of the plurality of video data items stored in the data storage unit.

6. The video data recording/reproducing apparatus according to claim 1, wherein the video data item is broadcast program data, and the input device includes a receiver unit that receives the broadcast program data.

7. The video data recording/reproducing apparatus according to claim 1, wherein the data storage unit includes a disk drive unit.

8. A method of managing video data stored in a data storage unit of a video data recording/reproducing apparatus, comprising:

inputting video data item to be recorded;

storing the input video data item in the data storage unit;

moving one of a plurality of video data items stored in the data storage unit to an external unit via a network, to increase a free memory space in the data storage unit, the moving including adding identification information for identifying the video data recording/reproducing apparatus to a video data item that is to be moved to the external unit;

determining whether a to-be-reproduced video data item is stored in the data storage unit or in the external unit;

reproducing the to-be-reproduced video data item from the data storage unit, if it is determined that the to-be-reproduced video data item is stored in the data storage unit;

executing a verification process for determining whether a to-be-reproduced video data item stored in the external unit is the video data item that is moved from the video data recording/reproducing apparatus, based on the identification information that is added to the to-be-reproduced video data item stored in the external unit;

executing a streaming process to reproduce a stream of the to-be-reproduced video data item while the stream of the to-be-reproduced video data item is being received from the external unit, if it is determined that the to-be-reproduced video data item is stored in the external unit and is the video data item that is moved from the video data recording/reproducing apparatus; and prohibiting execution of the stream process if it is determined that the to-be-reproduced video data item is not the video data item that is moved from the video data recording/reproducing apparatus.

9. The method according to claim 8, further comprising displaying a list of recorded video data items including video data item that is currently stored in the data storage unit and video data item that is moved to the external unit, wherein the determining includes determining whether to-be-reproduced video data item, which is selected from the list of recorded video data items, is stored in the data storage unit or in the external unit.

10. The method according to claim 8, wherein the moving of the video data item includes detecting a size of a free memory space in the data storage unit, and moving, if the detected size of the free memory space decreases to less than a predetermined value, one of the plurality of video data items stored in the data storage unit to the external unit by executing communication with the external unit via the network.

11. The method according to claim 8, further comprising:

detecting a size of a free memory space in the data storage unit;

finding video data item with attributes corresponding to a specified condition for deletion, on the basis of attributes of the plurality of video data items stored in the data storage unit, if the detected size of the free memory space decreases to less than a given value; and deleting the found video data item from the data storage unit, wherein the moving of the video data item includes moving one of the plurality of video data items stored in the data storage unit to the external unit via the network, if the video data item with attributes corresponding to the specified condition for deletion is not found.

12. The method according to claim 8, further comprising copying one of the plurality of video data items stored in the data storage unit to the external unit via the network, to back up contents of the data storage unit.

* * * * *